April 7, 1931. E. A. BURROWS Re. 18,025

REFRIGERATING DISPLAY APPARATUS

Original Filed April 8, 1921

Inventor:
Eastman A. Burrows,
By A. Milton Redfield Atty.

Reissued Apr. 7, 1931

Re. 18,025

UNITED STATES PATENT OFFICE

EASTMAN A. BURROWS, OF CHICAGO, ILLINOIS, ASSIGNOR TO THOMAS D. HUFF, OF CHICAGO, ILLINOIS

REFRIGERATING DISPLAY APPARATUS

Original No. 1,514,128, dated November 4, 1924, Serial No. 459,822, filed April 8, 1921. Application for reissue filed November 3, 1926. Serial No. 147,162.

This invention contemplates the construction of a table, counter, show case or cabinet or other table-topped structure with an ice top surface therefor to support food or other articles thereon, so that while the articles thus displayed on a body of ice are kept cool, as is necessary, for example, with fish and oysters and other kinds of food, it is also true, of course, that these or other articles are carried on a surface which, if the ice is kept smooth, simulates the glass top of a counter or table or show case upon which commodities of this kind are often dispensed or sold in stores and other places, it being understood, of course, that the ice thus provided is kept from melting by a refrigerating fluid which is circulated below the surface of the ice, thus ensuring the maintenance of the ice in condition to serve the desired purpose.

To these and other useful ends, the invention consists in matters hereinafter set forth and claimed, and shown in the accompanying drawings in which—

Figure 1:
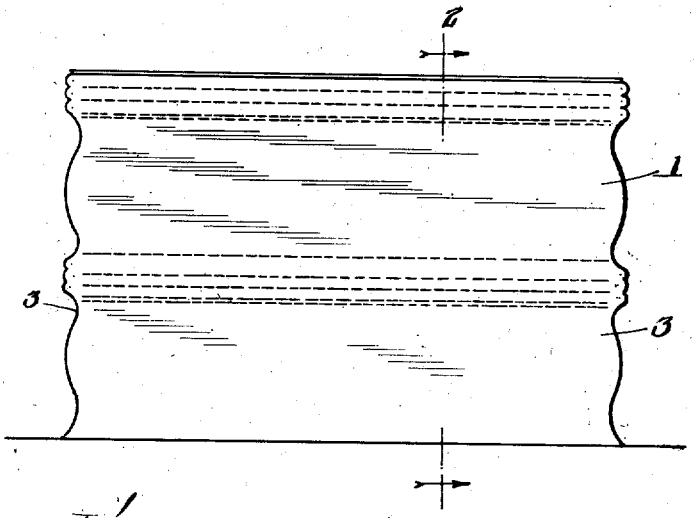
Figure 1 is a front elevation of a show case or counter for displaying and dispensing food, embodying the principles of the invention.
Figure 2:
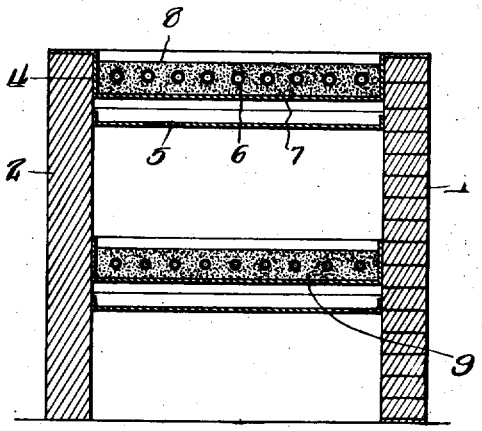
Figure 2 is a vertical transverse section on line 2—2 in Figure 1.

As thus illustrated, the invention comprises a front wall 1 and a rear wall 2 of any suitable character, and ends 3 of any desired form. The pan or tray 4 sets down in the top of the structure, and a drip pan 5 is provided immediately below. The coils 6 contain a suitable refrigerating fluid, and may be of any suitable character, and can be connected in operative relation to a refrigerating apparatus (not shown) of any suitable character. Sand 7 can be filled in around the coils if desired. Water is added to the sand and ice is formed to provide a smooth top surface 8 of smooth and slippery ice which, if the top be kept level and clear, will simulate the glass top of a table or counter or show case, so far as appearances are concerned, and which will take the place of the broken ice often used for purposes of this kind. The fish or other food articles can slide around on the top surface of the ice, as they would on a glass topped counter or table, and are kept cool by the open refrigeration thus provided. The edges of the tray 4 form a guard to keep the articles from sliding off the ice surface. Of course, a cover (not shown) can be placed over the food or other things, and the heat of the room kept away from the ice, if desired. In the drawings, the shelf 9 is similar to the ice support described, and the chamber between the two can be utilized for storage purposes in the ordinary manner. The sand, when used, reduces the amount of water or moisture necessary to produce the ice-topped structure, and the ice can be scraped and smoothed and repaired from time to time to keep it in good condition, and to preserve the resemblance which it has to a glass topped structure of any suitable, known or approved character.

The object of the circulating coils 6 is not only to produce the ice necessary to form the smooth support for the articles to be displayed, but also to prevent the ice from melting while the apparatus is in use, and to keep the food or other articles from melting the surface of the ice. Of course, the food or other articles will tend to melt the surface to some extent, but the circulating coils 6, or any suitable means for this purpose, will serve to retard or minimize this effect. As explained, when the ice surface becomes rough or pitted, it can then be repaired by scraping or by adding more water.

It will be seen, therefore, that the invention obviates the necessity for using glass or other permanent material for supporting the food or other articles to be dispensed or displayed to the public, for the bare surface serves this purpose in a satisfactory manner.

What I claim as my invention is:—

1. A device for displaying perishable articles comprising in combination, a stand, a display plate supported on the stand consisting of a plate or block of ice, the upper surface of which is adapted to support the articles to be kept cool during display, and refrigerating means for preventing melting of the ice.

2. A device for displaying perishable articles comprising in combination, a stand, a display plate supported on the stand consisting in a plate or block of ice, the upper surface of whch is adapted to support the articles to be kept cool during display, a guard extending around the display plate to prevent the articles placed thereon from sliding off, and refrigerating means for preventing melting of the ice.

3. A device for displaying perishable articles comprising in combination, a stand, an open topped liquid receptacle supported on the stand, a plate of ice within the receptacle with its upper surface below the edge of the receptacle so that this edge acts as a guard to prevent the articles placed on the surface of the ice from sliding off, and refrigerating means for preventing melting of the ice.

4. A display stand for perishable articles comprising an open topped relatively shallow tank adapted to hold water, means for supporting the tank at a distance above the ground or floor and a refrigerating coil adapted to freeze the water in the tank and to maintain the same in a frozen condition, whereby the articles to be displayed may be supported and kept cool by the ice thus formed.

5. A display stand for perishable articles comprising an open topped relatively shallow tank adapted to hold water and having marginal flanges, means to support the tank at a distance above the ground or floor, and a refrigerating coil adapted to freeze the water in the tank and to maintain the same in frozen condition whereby articles to be displayed may be supported and kept cool by the ice thus formed, the top surface of the stand thus comprising a central surface of ice surrounded by the marginal flanges of the tank.

6. A device for displaying perishable articles comprising in combination, a stand having a closed chamber, the upper wall of the chamber including a block of ice the upper surface of which constitutes a display surface for perishable articles, and means for preventing melting of the ice, which means serves also to cool the closed chamber.

7. A device for displaying perishable articles comprising in combination, a stand having side and end walls, a top, and a portion parallel to the top and enclosing together with the top and walls a closed chamber, the top wall including a plate of ice adapted to support articles to be displayed, and means for maintaining the display surface of said ice plate in a frozen condition and for simultaneously cooling the closed chamber.

8. A display stand for perishable articles comprising an open topped relatively shallow tank adapted to hold water and having wide horizontally disposed marginal flanges, means to support the tank at a distance above the ground or floor and a refrigerating coil adapted to freeze the water in the tank and to maintain the same in frozen condition whereby articles to be displayed may be supported and kept cool by the ice thus formed, the top surface of the stand thus comprising a central surface of ice surrounded by the flat horizontal marginal flanges of the tank.

9. A display stand for perishable articles comprising an open topped relatively shallow tank adapted to hold water, means to support the tank at a distance above the floor or ground, a refrigerating coil adapted to freeze the water in the tank and to maintain the same in frozen condition whereby articles to be displayed may be supported and kept cool by the ice thus formed, and means extending around the upper edge of the tank and forming a protective rim therefor.

10. The method of displaying food or other articles comprising the circulation of a refrigerating fluid in a plane below the position desired for the article, supplying water to the area over said means, so that ice is formed with an exposed surface to provide a support for the food or other articles to be displayed, placing such articles on the surface of the ice, and maintaining said circulation sufficiently to prevent melting of the ice support thus formed.

11. An apparatus of the class specified having a refrigerating element for use in displaying perishable articles, said element comprising an icy structure containing refrigerating pipes adapted to freeze said element and maintain same in frozen condition.

12. The herein described method which consists in forming a refrigerating element by combining sand and water, freezing the latter, placing articles to be displayed above said element and maintaining said element in said frozen condition.

13. An apparatus of the class specified having an ice-like refrigerating support for use in displaying perishable articles, said support being composed in part of solid material and in part of frozen liquid, and means for maintaining said support in refrigerating condition.

14. An apparatus of the class specified having a refrigerating support for supporting perishable articles for display purposes, said support consisting of granular material and frozen liquid, and means embedded in said support and adapted to maintain the same in frozen condition.

In witness whereof I hereunto subscribe my name this 29th day of October, 1926.

EASTMAN A. BURROWS.